No. 797,497. PATENTED AUG. 15, 1905.
P. J. & R. P. CONKLIN.
LOADER.
APPLICATION FILED DEC. 23, 1904.

3 SHEETS—SHEET 1.

Witnesses
C. K. Reichenbach.
H. M. Baldwin.

Inventors
P. J. Conklin and
R. P. Conklin.
Attorneys

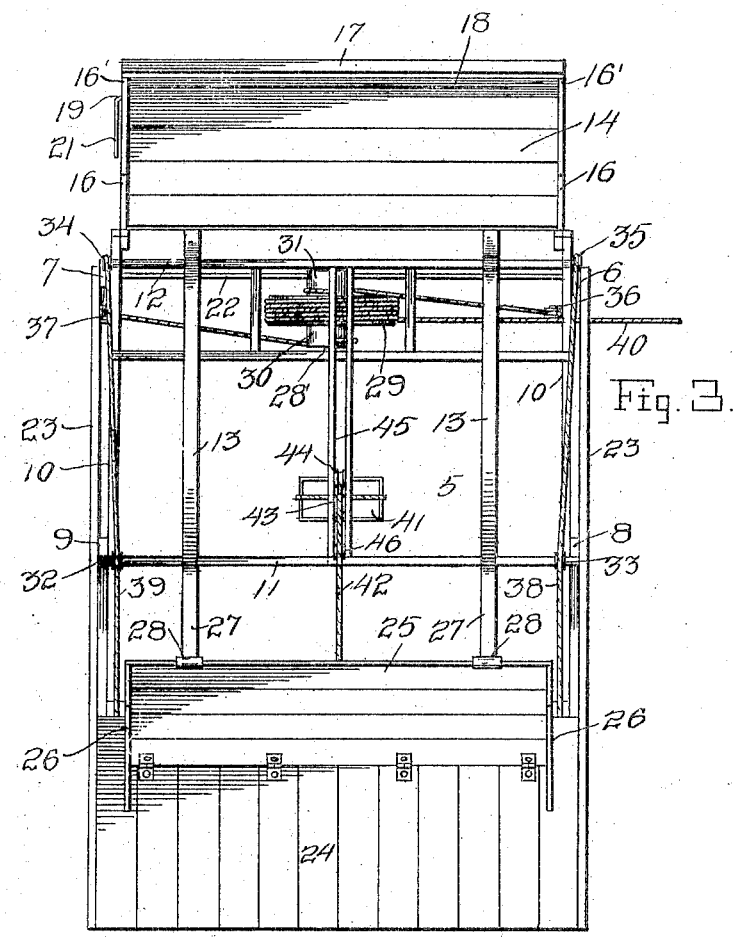
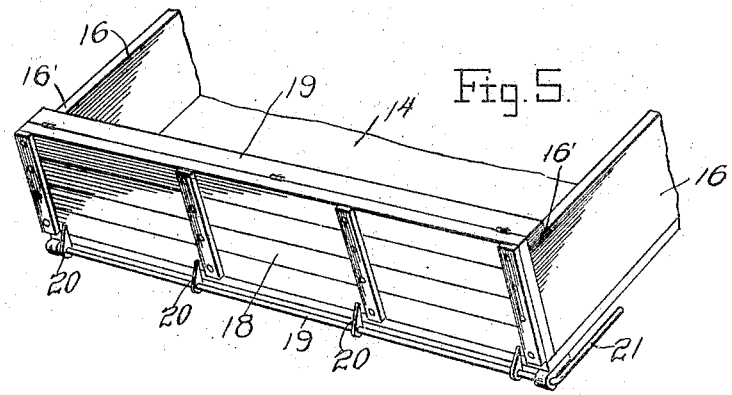

No. 797,497. PATENTED AUG. 15, 1905.
P. J. & R. P. CONKLIN.
LOADER.
APPLICATION FILED DEC. 23, 1904.
3 SHEETS—SHEET 3.
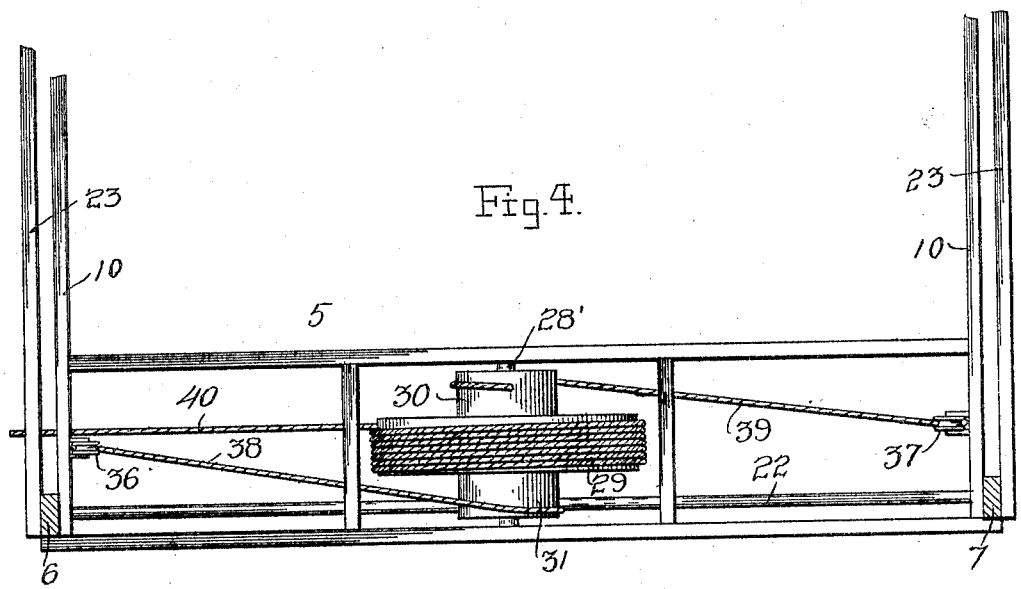

UNITED STATES PATENT OFFICE.

PETER J. CONKLIN AND REUBEN P. CONKLIN, OF GAYVILLE, SOUTH DAKOTA.

LOADER.

No. 797,497.   Specification of Letters Patent.   Patented Aug. 15, 1905.

Application filed December 23, 1904. Serial No. 238,091.

*To all whom it may concern:*

Be it known that we, PETER J. CONKLIN and REUBEN P. CONKLIN, citizens of the United States, residing at Gayville, in the county of Yankton, State of South Dakota, have invented certain new and useful Improvements in Loaders; and we do hereby declare the following to be a full, clear, and exact description of the invention, such as will enable others skilled in the art to which it appertains to make and use the same.

This invention relates to loaders, and more particularly to those designed for loading wagons with fertilizer or other materials, and has for its object to provide a loader which will combine efficiency with comparative simplicity of construction and which will be provided with means for regulating the time at which the contents of the loader is discharged therefrom.

A further object is to provide a loader so arranged that the lifting mechanism may be returned to its position for loading before the material just raised by the lifting mechanism is discharged from the loader, a receptacle being provided into which the material is discharged from the lifting mechanism and from which it may be allowed to pass at will.

Other objects and advantages will be apparent from the following description, and it will be understood that changes in the specific construction shown may be made and that any suitable material may be used without departing from the spirit of the invention.

Figure 1:
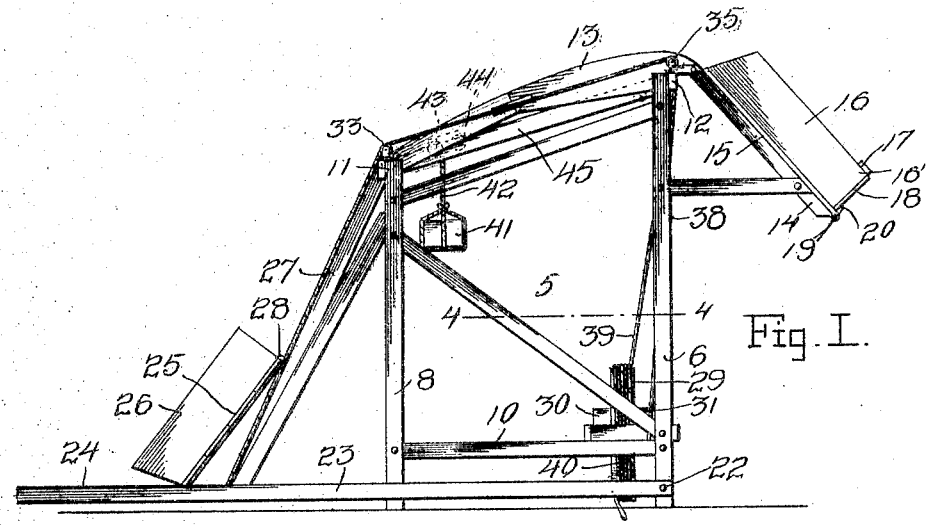
Figure 2:
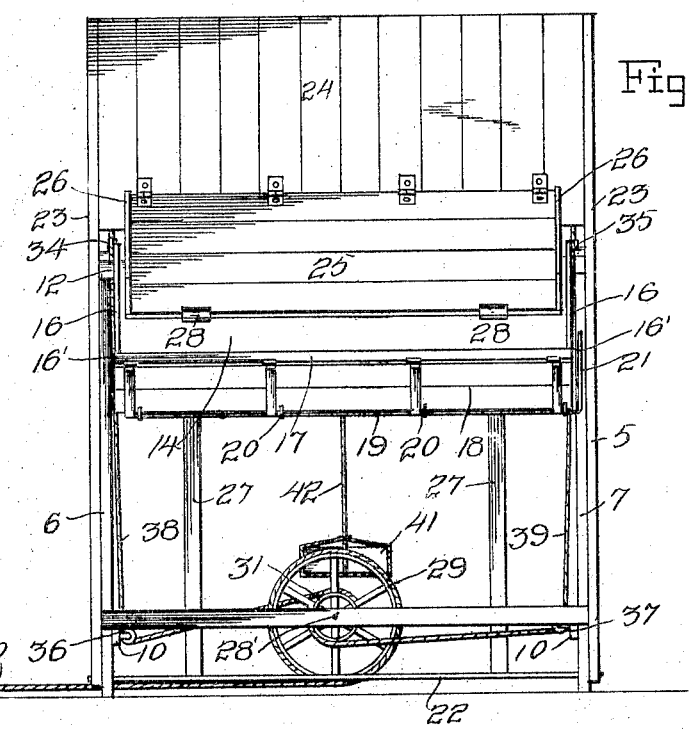

In the drawings forming a portion of this specification, and in which like numerals of reference indicate similar parts in the several views, Figure 1 is an end view of the present invention, showing the raising mechanism in its lowered position. Fig. 2 is an elevation of the loader, showing the raising mechanism in position to discharge its contents into the chute. Fig. 3 is a top plan view. Fig. 4 is a section on line 4 4 of Fig. 1 and illustrating the winding-drums in top plan. Fig. 5 is a detailed view of the chute and its discharge-door.

Referring now to the drawings, the present invention comprises a frame 5, including corner-uprights 6, 7, 8, and 9, which are connected at their lower ends by suitable braces 10. The uprights 8 and 9, which are at the rearward side of the frame, are connected at their upper ends by a horizontal beam 11, and the upper ends of the forward uprights 6 and 7 are connected by a similar beam 12, and these beams are connected by transverse upwardly-curved spaced tracks 13, the uprights 6 and 7 being somewhat longer than the uprights 8 and 9, as shown.

Extending outwardly and downwardly from the beam 12 are a plurality of supports 14, to the outer faces of which there is secured a platform 15, having walls 16, extending outwardly at right angles thereto at its ends.

Secured to the outer lower corners 16' of the walls 16 are the ends of a hinge-plate 17, to which there is hinged a vertically-swinging door 18, arranged for movement into and out of position to close the space between the lower ends of the walls 16, and pivoted at the lower edge of the platform 15 there is a longitudinally-extending rod 19, having a plurality of ears 20 extending therefrom. The rod 19 is provided with a lever 21, by which it may be moved, and when the door 18 is in its lowered position the lever 21 may be moved to bring the ears 20 into engagement with the lower portion of the door to prevent outward and upward movement thereof.

Journaled at its ends in the lower ends of the uprights 6 and 7 there is a shaft 22, and secured to the ends of this shaft outwardly of the uprights are a pair of arms 23, which extend rearwardly considerably beyond the uprights 5. Secured at its ends to the free end portions of the arms 23 there is a platform 24, and hinged to the forward edge of this platform there is an apron 25, having outwardly-extending walls 26 at its ends, this apron being movable to bring the ends of its walls into engagement with the platform 24.

Extending outwardly and downwardly from the rearward ends of the tracks 13 are tracks 27, and the apron 25 is provided with rollers 28 at its free edge arranged to rest against these tracks and to move thereover and over the tracks 13 when the free ends of the arms 23 are raised.

Mounted transversely of the frame 5, adjacent to the lower forward corner thereof, there is a revoluble shaft 28', having mounted centrally thereon a winding-drum 29 and mounted upon the shaft 28', one at either side of the drum, are smaller drums 30 and 31.

Mounted adjacent to the ends of beam 11 are rollers 32 and 33, similar rollers 34 and 35 being mounted adjacent to the ends of the beam 12. Mounted one upon each of the end braces 10 are pulleys 36 and 37.

Secured at one end to the inner edge of the platform 24, adjacent to the ends thereof, are cables 38 and 39, the cable 39 being engaged over the rollers 32 and 34 and passing downwardly from the latter beneath the pulley 37, from which it passes to the drum 30, to which it is secured. The cable 38 is similarly engaged with the rollers 33 and 35 and the pulley 36 and is secured to the drum 31. A cable 40 is secured to the drum 29 and may be wound thereupon, the arrangement being such that when the cable is unwound from the drum 29 the cables 38 and 39 are wound upon the drums 30 and 31. It will be readily seen that this will raise the free ends of the arms 23, the apron 25 passing over the tracks 27 and 13, as mentioned above. It will be understood that this upward movement of the arms causes apron 25 to move upon its hinges and bring the ends of its walls 26 into engagement with the platform 24 and that when the arms 23 have reached a vertical position the apron 24 will move downwardly upon its hinges and will rest against the platform 15. It will thus be seen that any material placed upon the platform 24 when the arms 23 are in their lowered position will be transferred when the arms are raised to the chute formed by the platform 15 and the walls 16 and will be held therein by the door 18.

To aid in raising the load, a balance-weight 41 is provided. This weight is secured to one end of a cable 42, passed between rollers 43 and 44, which are mounted upon a transverse member 45, extending between the beams 11 and 12, the remaining end of this cable being secured to the platform 24. A roller 46 is mounted upon the beam 11, adjacent to the roller 43 and parallel therewith, and receives the cable 42 when the arms are in their lowered positions.

After the contents of the platform 24 and apron 25 have been deposited upon the platform 15 a wagon may be driven beneath this platform, and the door 18 may be released by moving the lever 21 to disengage the ears 20 from the door, the weight of the material upon the platform 15 causing the door to swing outwardly, as will be readily understood.

The cable 40 is provided with means for attaching a team thereto.

What is claimed is—

1. A loader comprising a frame, arms pivoted in the frame for vertical movement, tracks mounted in the frame, a platform secured to the arms, an apron pivoted to the platform and arranged for movement over the tracks, said apron and platform being adapted for the reception of material to be loaded, a chute arranged to receive matter from the apron when the arms are at the upward limit of their movements, rollers mounted in the frame, cables engaged with the rollers and connected with the arms, a winding-drum mounted in the frame, said cables being engaged with the drum and adapted to be wound thereon to raise the arms, means for revolving the drum, and a balance-weight connected with the arms.

2. A loader comprising a frame including corner-uprights, horizontal members connected with the uprights, parallel tracks secured to the horizontal members, tracks connected with the ends of the first-named tracks and extending downwardly from the frame at one side thereof, arms pivoted to the frame for vertical movement at the opposite side thereof from the second-named tracks and extending beyond said tracks when at the downward limit of the movements, a platform carried by the frame beyond the tracks, an apron pivoted to the platform and having rollers resting upon the tracks, said apron being arranged for movement over the tracks when the arms are moved upon their pivots, said apron and platform being arranged for the reception of material to be loaded, means for raising the arms, and a chute arranged to receive material from the apron when the arms are at the upward limit of their movements.

3. A loader comprising a frame including corner-uprights, longitudinally-extending horizontal members secured to the upper ends of the uprights, transversely-extending parallel tracks secured to the horizontal members, a chute located at one end of the tracks, supplemental tracks connected with the first-named tracks at their opposite ends from the chute, said supplemental tracks extending outwardly and downwardly from the frame, a load-carrying device arranged for movement over the tracks, and means for moving said device, said load-carrying device being arranged to discharge into the chute when it is at one limit of its movement.

4. A loader comprising a frame, tracks mounted upon the frame, arms pivotally connected with the frame at one end for vertical movement of their remaining ends, a platform carried by the free ends of said arms, an apron connected with the platform and arranged for movement over the tracks, said apron and platform being arranged for the reception of the material to be loaded, a receptacle arranged to receive material from the apron, and means for raising the arms.

In testimony whereof we affix our signatures in presence of two witnesses.

PETER J. CONKLIN.
REUBEN P. CONKLIN.

Witnesses:
R. S. COOLEY,
C. H. DILLON.